(No Model.)
S. B. STINE.
MINING MACHINE.
No. 356,699. Patented Jan. 25, 1887.
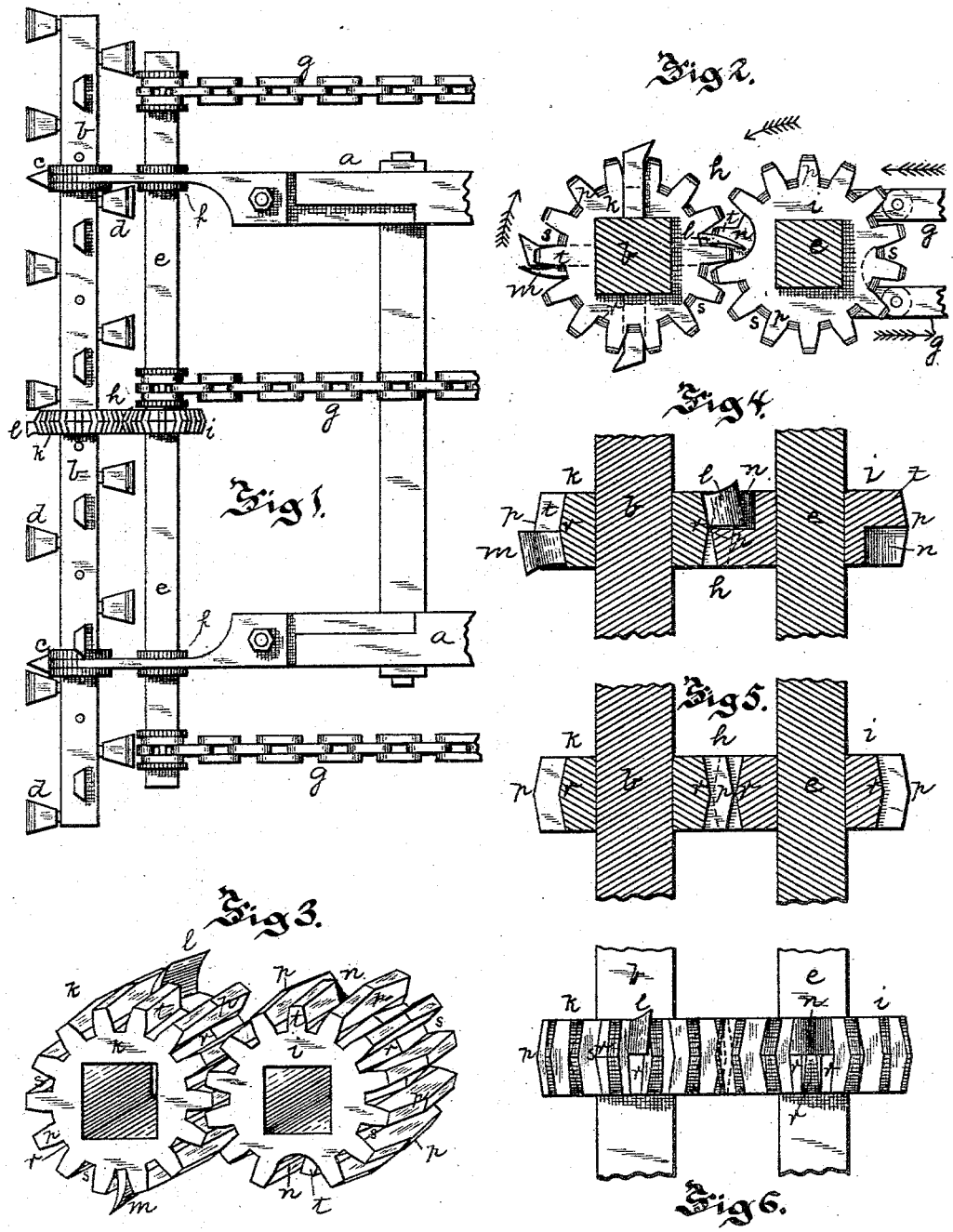
Witnesses:
J. G. Hay
J. E. Barnes
Inventor.
Samuel B Stine
By James J. Ray
Attorney

UNITED STATES PATENT OFFICE.

SAMUEL B. STINE, OF OSCEOLA MILLS, PENNSYLVANIA.

MINING-MACHINE.

SPECIFICATION forming part of Letters Patent No. 356,699, dated January 25, 1887.

Application filed June 1, 1886. Serial No. 203,780. (No model.)

*To all whom it may concern:*

Be it known that I, SAMUEL B. STINE, of Osceola Mills, in the county of Clearfield and State of Pennsylvania, have invented a new and useful Improvement in Mining-Machines; and I do hereby declare the following to be a full, clear, and exact description thereof.

My invention relates to coal-mining machines, having special reference to that class of machines by means of which the body of the coal is undercut so that it may be dropped by means of a blast in the upper part of the vein; and it has special reference to that class of mining-machines in which a rotating bar carrying cutters is employed to undercut the body of the coal. As these machines have heretofore been constructed the bar is rotated by means of a chain passing over the bar and engaging with sockets or squared surfaces thereon, and so turning the bar and causing the knives or cutters thereon to cut into the coal, the coal so cut out being carried back by means of the driving or other chains, so that the frame carrying the rotating cutter can be advanced farther into the coal, the machines generally undercutting about five feet at each operation thereof. As it was necessary to provide space for the movement of the chain by means of which the cutter-bar was turned, certain means have heretofore been employed for cutting out the coal in the course of the chain, the first being to place knives at intervals on the chain, these knives cutting out the coal and so enabling the chain to run free, while in the second construction the course for the movement of the chain was cut out by means of a narrow knife in the cutter-bar passing up within the wide link of the driving-chain, and two like knives on the cutter-bar which entered the space on each side of the narrow link of the chain, these three knives thus cutting out a course within which the chain traveled without coming in contact with the coal. By means of these devices the cutter-bar was driven so that the knives or cutters thereon cut in a downward direction into the coal, and in this action it was found that a heavy strain or back-pressure was created against the bed of the mining-machine and the feeding mechanism thereof, so throwing the heavy strain upon the machine; but as the driving-chain was employed to carry back the larger portion of the cuttings or coal-dust it is evident that it was necessary for the chain to travel backward close to the bottom wall of the cut formed so as to carry back the coal-dust therewith, and for this reason the cutter-bars have always been arranged to move in this direction. In some cases it was found that the narrow cutter which entered within the links of the driving-chain was liable to wedge therein and cause difficulty in running. The knives or cutters on the driving-chain were also found objectionable, as it was difficult to adjust them in such manner as to cut the one after the other without throwing such strain on certain knives as to cause the breaking thereof.

The object of my invention is to provide a means for rotating this cutter-bar which will overcome the difficulties heretofore found where the driving-chain passed directly over the bar, and also to relieve the machine of the strain heretofore brought upon it on account of the back-pressure of the cutter-bar when cutting downwardly into the coal. This I accomplish by employing a separate drive-chain shaft mounted immediately back of the cutter-bar, and cog-gearing connecting the said chain-shaft and cutter-bar shaft, the pinion on the cutter-bar being provided with knives or cutters to cut a course for the cog-gearing, the cutter-bar being thus driven by means of cog-gearing from the chain-shaft, and being driven in an opposite direction to the chain and shaft, so that the knives cut the coal with an upward movement, and, instead of creating a heavy back-pressure upon the machine, it is found that the upward cutting of the knives creates a slight strain upon the cutter-bar, which substantially overcomes the back-pressure and in some cases draws the bar into the coal as it is rotated, while at the same time the drive-chains travel back along the bottom wall of the cut made and carry back the cuttings of coal-dust.

I have also provided a special construction of cog-gearing by means of which the cutter-bar is rotated, so that provision is made for cutting out the coal in the course of the pinions or cog-gearing, and the knives employed are so disposed as to interfere but little, if any, with the strength of the gearing, and the form of gear-teeth is such that there is no liability of the coal-dust or cuttings entering between the teeth and causing the clogging or breaking of the same.

To enable others skilled in the art to make and use my invention, I will describe the same more fully, referring to the accompanying drawings, in which—

Figure 1 is a top view of the forward part of a mining-machine, illustrating my invention. Fig. 2 is a side view of the cog-gearing. Fig. 3 is a perspective view of the same. Figs. 4 and 5 are horizontal cross-sections of the gearing in different positions, and Fig. 6 is a top view thereof.

Like letters of reference indicate like parts in each.

In the drawings, a represents the sliding frame at the forward end, in which the cutter-bar b is mounted in bearings c, these bearings being so constructed as to give proper support to the cutter-bar, and at the same time to permit the knives or cutters d thereon to cut on each side of the bearings, leaving but a small space to be broken by the forward edge thereof, this construction of bearing and cutter-bar being common in these machines.

Mounted back of the cutter-bar b is the chain-bar e, this chain-bar being journaled in suitable bearings, f, and the chains g passing over sprockets on this chain-bar e, so as to rotate the same, these chains being driven by any suitable power. The cutter-bar b and chain-bar e are parallel with each other, the chain-bar being directly back of the cutter-bar, so that the knives thereon cut a course within which the chain-bar enters, and the cutter bar b is driven by means of the cog-gearing h from the chain-bar e, this cog-gearing consisting of the pinion i on the chain-shaft e and the pinion k on the cutter-bar b, the cutter-bar being rotated by means of this gearing, so that the knives pass in an upward course in front of the cutter-bar—that is, that they cut the kerf or course in the coal upwardly—the knives thus acting to cut the coal and throw the cuttings over the top of the cutter-bar into the course of the drive-chain, instead of cutting it downwardly and forcing it back into the course of the drive-chain, as in all mining-machines heretofore constructed. In cutting the coal in this manner by means of an upward cut it is found that a large amount of strain upon the mining-machine is removed, and that, instead of there being a heavy back-pressure upon the stationary bed of the machine and upon the feeding mechanism by means of which the sliding frame is forced forward, this pressure is almost entirely removed, it only being necessary to secure the bed firmly in place, and no special bracing being required, and in some cases it is found that the jacks by means of which the bed is secured against the back-pressure are loosened, showing a drawing strain of the cutter-bar and a tendency for it to be drawn into the coal as it cuts.

It is evident that in rotating the cutter-bar by means of this cog-gearing two difficulties are found, the first being that unless means are provided for cutting a course in front of the cog-gearing the teeth thereof will be broken, or, rather, be worn out by contact with the coal, and the second being that if ordinary cog-gearing is employed the coal-dust or cuttings will enter within the teeth of the cogs and cause the clogging and breaking of the same.

To overcome the first difficulty, I provide the pinion k on the cutter-shaft b with knives or cutters l m, these knives extending out beyond the cog-gear, and so acting to cut a course for the same. As, however, these knives extend beyond the teeth of the pinion k, it is evident that they would strike against the teeth of the pinion i as the pinion is rotated. To provide in said pinion for a reception of these knives, I have formed the recesses or depressions n extending into the peripheral face thereof, and in depth corresponding to the size of the knives, into which recesses the knives enter, one half of one tooth in the course of the knife being removed and the knife entering the recess n thus formed, while the remaining half of the tooth acts to rotate the cutter-bar when that portion of the pinions mesh together. The knife l is formed on one side of the pinion, cutting a course for one half thereof, and the knife m is formed on the opposite side thereof, cutting a kerf for the other half of the pinion, the two knives thus serving to cut clearance for the entire face of the pinion, and, as the pinion i is directly back of the pinion k, it also cuts clearance for the course of this pinion.

In order to prevent the choking of the cog-gearing by means of coal-dust or cuttings, I have constructed them as most clearly illustrated in Figs. 3 and 5, the peripheral faces of the teeth p of the pinions being beveled or inclined from the center thereof downwardly toward each edge of the pinions, while the bases r of the depressions s between the cogs are correspondingly inclined downwardly from the center toward the edges, and as the pinions mesh with each other it is evident that, though the highest portions of the teeth p project and fit closely to the highest portions of the bases r between the teeth, yet, as both these depressions and the peripheral faces of the teeth are inclined downwardly toward the outer edges, as shown, large spaces between the faces of the teeth are left, through which any coal-dust or cuttings would be forced in case there was any tendency for them to clog the cog-gearing. By so constructing the faces of the teeth and the depressions between them, as is clearly shown in the drawings, I provide clearance for all such coal-dust and cuttings, and assure the operation of the cog-gearing, even though the coal-dust is thrown by the cutter-bars right over the top of the cog-gearing and between the working-faces of the same, where they mesh.

When my improved mining-machine is in operation, as the sliding frame a is advanced by the feeding mechanism the drive-chains *g* travel forward over the chain-shaft *e* and backward along the floor of the mine or cut made under the coal. At the same time the pinion *i* on the chain-shaft meshes with the pinion *k* on the cutter-bar and rotates said bar in such direction that the knives or cutters *d* rise in cutting the coal and carry the cuttings over the bar, throwing them back toward the drive-chains *g*, by means of which they are carried back out of the kerf or cut made, the chains carrying back the cuttings, for the reason that they travel backward close to the floor or lower surface of the cut made.

It has been practically proven that when the cutter-bar rotates in the direction described, so that the knives cut with an upward movement, the machine is relieved from the heavy back-pressure found when the cutter-bar rotates in the other direction, and that less force is required to rotate the cutter-bar, the bar running more freely, as its knives are not pressing against a mass of cuttings, and no force is required to push the cuttings back to the chains, the cuttings being thrown back over the bar, where they do not impede the movement of the bar.

During the cutting of the kerf the knives *l m* on the pinion *k* cut a course or path for the cog-gearing, the knife *l* cutting one half the path and the knife *m* cutting the other half thereof, and the knives as the gearing rotates entering the recesses *n* in the pinion *i*, while the half-teeth *t* in the pinions *i* and *k* sustain the pressure or strain of the gearing at these points. As the cog-gears engage with each other, the central portions of the teeth *p* extend close to the central portions of the bases *r* of the depressions *s* between the teeth, and the gearing having sufficient strength for all strain brought upon it, while, as the faces of these teeth and the bases of the depressions are downwardly inclined, full space is formed within the meshing faces of the gearing into which any cuttings obstructing the proper meshing of the teeth may be forced, the crowding or breaking of the cog-gearing being thus prevented.

In case any portion of either pinion should be broken, it can be quickly replaced, extra sets of pinions being supplied for this purpose.

What I claim as my invention, and desire to secure by Letters Patent, is—

1. In a mining-machine, the combination of a cutter-bar carrying a series of knives and rotating in such direction as to cut with an upward movement, and one or more drive-chains traveling backwardly along the floor of the cut made, substantially as and for the purposes set forth.

2. In a mining-machine, the combination of a chain-shaft, driving-chains rotating said shaft, a cutter-bar mounted in front of said chain-shaft, and power-driving connections directly between said shaft and cutter-bar, substantially as and for the purposes set forth.

3. In a mining-machine, the combination of the cutter-bar, the shaft mounted back of and parallel therewith, and cog-gearing connecting said shafts, substantially as and for the purposes set forth.

4. In a mining-machine, the combination of a cutter-bar carrying a pinion provided with one or more cutters, and a shaft mounted back of and parallel with the cutter-bar, and carrying a pinion having one or more recesses to receive said cutters, substantially as and for the purposes set forth.

5. The combination of the pinion *k*, carrying the knife *l* on one side of and adapted to cut a kerf for one half the pinion, and the knife *m* on the other side of and adapted to cut a kerf for the other side of the pinion, and the pinion *i*, having depressions *n* in the course of said knives, substantially as and for the purposes set forth.

6. The combination of the pinion *k*, carrying the knives *l m*, the pinion *i*, having the depressions *n* in the course of the knives, and the half-teeth *t*, substantially as and for the purposes set forth.

7. In a mining-machine, cog-gearing having the peripheral faces of its teeth or cogs downwardly inclined from the center toward the edges to provide clearance for the cuttings, substantially as set forth.

8. In a mining-machine, cog-gearing having the faces of the teeth and the bases of the depressions between the teeth downwardly inclined or beveled from the center toward the outer edges, substantially as and for the purposes set forth.

In testimony whereof I, the said SAMUEL B. STINE, have hereunto set my hand.

SAMUEL B. STINE.

Witnesses:
CHAS. R. HORTZ,
W. H. PATTERSON.